United States Patent
Chen et al.

(10) Patent No.: US 7,289,410 B2
(45) Date of Patent: Oct. 30, 2007

(54) ADIP DEMODULATION METHOD AND APPARATUS

(75) Inventors: Hao-Cheng Chen, Chung Ho (TW); Wen-Yi Wu, Hsin Chu County (TW)

(73) Assignee: Media Tek Inc., Hsin Chu (TW)

( * ) Notice: Subject to any disclaimer, the term of this patent is extended or adjusted under 35 U.S.C. 154(b) by 592 days.

(21) Appl. No.: 10/623,576

(22) Filed: Jul. 22, 2003

(65) Prior Publication Data
US 2004/0120238 A1 Jun. 24, 2004

(30) Foreign Application Priority Data
Jul. 24, 2002 (TW) .............................. 91116530 A

(51) Int. Cl.
*G11B 7/00* (2006.01)
(52) U.S. Cl. ................. 369/53.34; 369/59.23
(58) Field of Classification Search ..................... None
See application file for complete search history.

(56) References Cited
U.S. PATENT DOCUMENTS
6,265,919 B1 * 7/2001 Guisante et al. ............ 327/159
6,657,929 B1 * 12/2003 Minamino et al. ......... 369/44.13
2003/0086348 A1 * 5/2003 Takahashi ................ 369/53.34
2003/0198164 A1 * 10/2003 Eom ....................... 369/53.34

* cited by examiner

*Primary Examiner*—William Korzuch
*Assistant Examiner*—Joseph Haley
(74) *Attorney, Agent, or Firm*—Birch, Stewart, Kolasch & Birch, LLP

(57) ABSTRACT

An ADIP demodulation method and apparatus, which are used in an optical disk driver to generate the ADIP information according to a wobble signal. The apparatus includes a slicing unit for receiving the wobble signal and generating a wobble pulse, a phase locked loop for generating a reference wobble signal with the same frequency and phase as the wobble pulse and a reference clock with frequency higher than the wobble pulse, a channel bit generator for generating a channel bit signal according to the reference wobble signal and the wobble pulse, and a decoder for decoding to ADIP information according to the channel bit signal. The channel bit generator generates a difference signal between the wobble pulse and the reference wobble signal, and outputs the channel bit signal according to the difference signal.

18 Claims, 6 Drawing Sheets

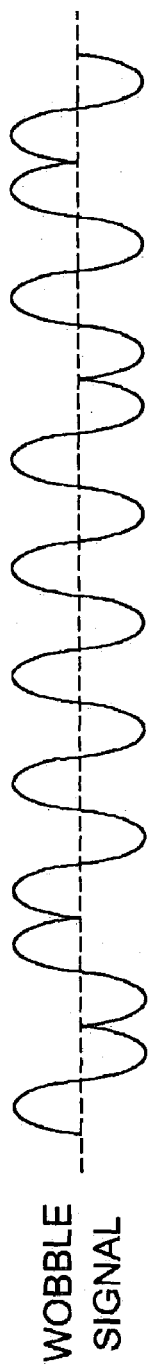
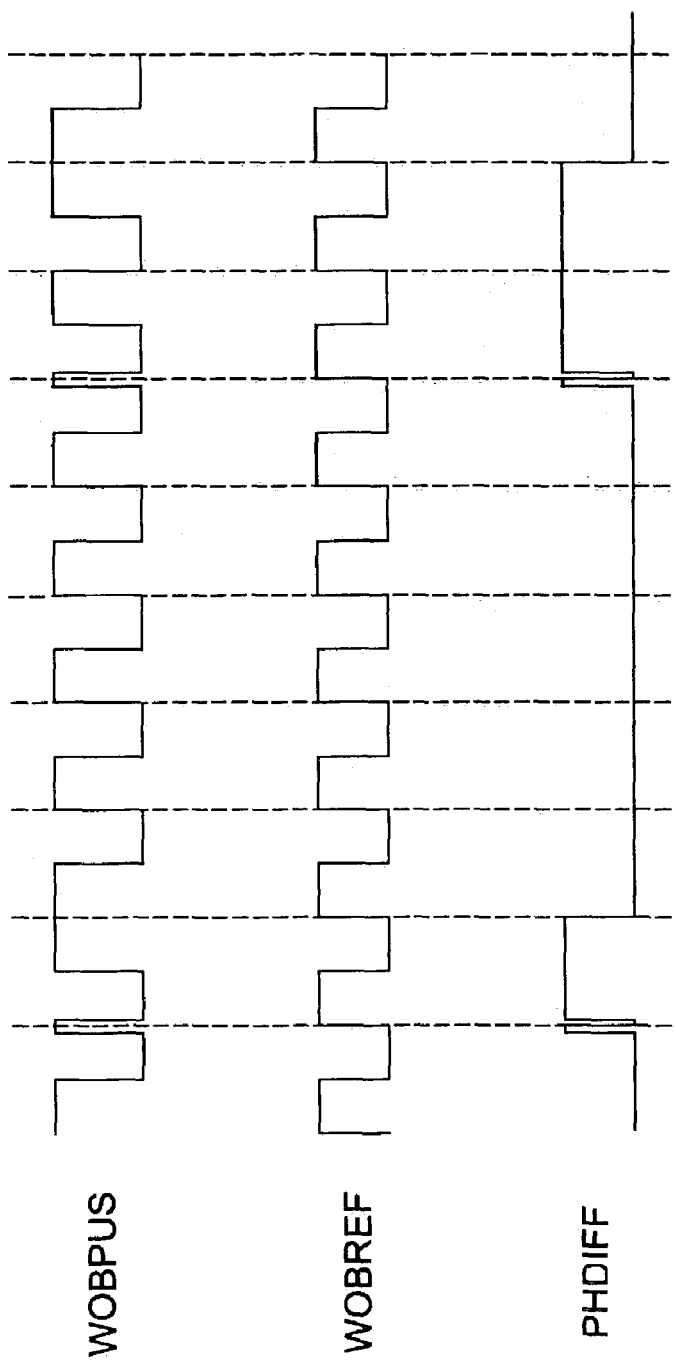
FIG. 4A  WOBBLE SIGNAL
FIG. 4B  WOBPUS
FIG. 4C  WOBREF
FIG. 4D  PHDIFF FIG. 4E
FIG. 4F
FIG. 4G
FIG. 4H
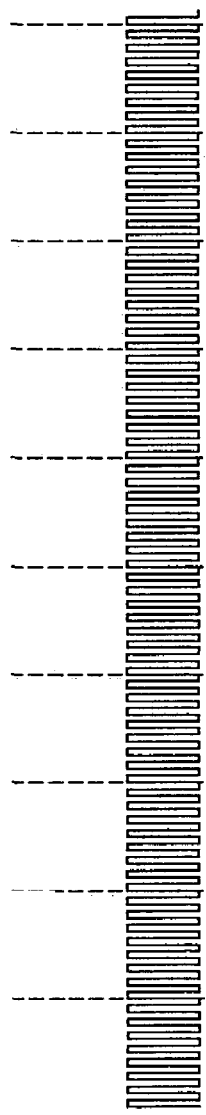
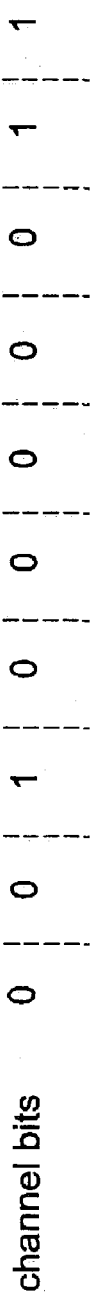
WCK
PCK
CNT_VAL
channel bits

ADIP DEMODULATION METHOD AND APPARATUS

BACKGROUND OF THE INVENTION

1. Field of the Invention

The invention relates to an ADIP (Address In Pre-groove) demodulation method and apparatus, and more particularly to an ADIP demodulation method and apparatus, which generates a difference signal between the wobble signal and the reference wobble signal and outputs the channel bit signal according to the difference signal.

2. Description of the Related Art

In the DVD+R (Recordable Digital Versatile Disk) or DVD-+RW (Rewritable Digital Versatile Disk), the ADIP (Address In Pre-groove) records the address of each track zone so as to locate the to-be-recorded track zones according to the ADIP information during the recording process. FIGS. 1A~1C show the rules of the ADIP modulation according to the specification of DVD+R/RW, and the wobble signal after modulation is the phase-change signal. According to the specification of DVD+R/RW, each data block includes 93 wobble cycles, wherein 8 wobble cycles are modulated with ADIP information and other 85 wobble cycles are positive wobble signal.

As shown in FIGS. 1A~1C, 8 wobble cycles of phase modulation wobble signal with the ADIP information only represent three states, i.e., the sync data of FIG. 1A, the data 0 of FIG. 1B, and the data 1 of FIG. 1C. When the optical disk driver retrieves the analog wobble signal from the disk, the analog wobble signal has to be digitized and converted into the channel bit, which is then decoded into the ADIP information by an ADIP decoder. The channel bit corresponding to the sync data is "11110000," the channel bit corresponding to the data 0 is "10000011," and the channel bit corresponding to the data 1 is "10001100." Thus, the ADIP decoder can generate the ADIP information only according to the channel bits. However, since noises may influence the channel bits, the ADIP decoder may have errors during the decoding process. Consequently, the DVD+R/RW optical disk driver must have an ADIP demodulation method and apparatus with high noise tolerance.

In the conventional ADIP demodulation method, the wobble signal is assumed to be a cosine signal with a phase A. The wobble signal is first digitized and then multiplied by a sine wave with a phase of B, that is, the multiplied signal equals:

$$\text{Cos } A * \text{Sin } B = \tfrac{1}{2}(\sin(A+B) - \sin(A-B)).$$

Next, the multiplied signal is transferred to an integrator and the value of B is adjusted to make the value of the multiplied signal to be 0. When A=B (i.e., the phases are the same), the value equals to 0. At this time, the above-mentioned sine wave is the to-be-generated wobble sync signal (wobsync).

The original signal Cos A is multiplied by a cosine signal with a phase B of the wobble sync signal, and we may obtain:

$$\text{Cos } A * \text{Cos } B = \tfrac{1}{2}(\cos(A+B) + \cos(A-B)).$$

Similarly, the signal is transferred for integration. When A=B, the value equals to +1, and when the phases are opposite, the value equals to −1, thereby the ADIP signal being decoded according to the changes.

However, the method mentioned above needs to use 8-bit analog-to-digital converter (ADC) to convert the wobble signal into digital data, and complicated operations of trigonometric functions has to be performed accordingly. Thus, the design is complicated and the cost is higher.

SUMMARY OF THE INVENTION

In view of the above-mentioned problems, an object of the invention is to provide an ADIP demodulation method and apparatus with good noise immunity for ADIP signal without using 8-bit analog-to-digital converters and complicated operations of the trigonometric functions.

To achieve the above-mentioned object, the ADIP demodulation apparatus of the invention includes a slicing unit for receiving the wobble signal and generating a wobble pulse, a phase locked loop for generating a reference wobble signal with the same frequency and phase as the wobble pulse according to the wobble pulse and a reference clock with frequency higher than the wobble pulse, a channel bit generator for generating channel bits according to the reference wobble signal and the wobble pulse, and a ADIP decoder for generating ADIP information according to the channel bits.

The channel bit generator generates a difference signal between the wobble pulse and the reference wobble signal, and outputs the channel bit signal according to the difference signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more filly understood from the detailed description given hereinbelow and the accompanying drawings which are given by way of illustration only, and thus are not limitative of the present invention, and wherein:

FIGS. 4A~4H show a schematic illustration of the waveforms of some signals, wherein FIG. 4A represents a wobble signal, FIG. 4B represents a wobble pulse WOBPUS, FIG. 4C represents a reference wobble signal WOBREF, FIG. 4D represents a difference signal PHDIFF, FIG. 4E represents a reference clock WCK, FIG. 4F represents a positive edge pulse PCK, FIG. 4G represents a count value, and FIG. 4H represents a channel bit signal.

DETAILED DESCRIPTION OF THE INVENTION

The ADIP demodulation method and apparatus of the invention will be described with reference to the accompanying drawings.

Figure 1A:
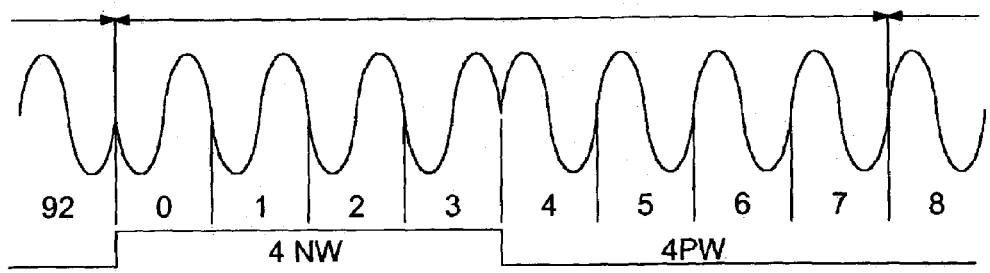
FIG. 1A shows the sync data of the ADIP modulation.
Figure 1B:
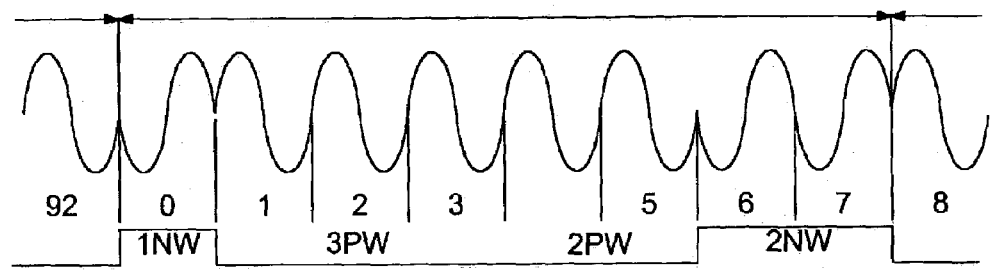
FIG. 1B shows the data 0 of the ADIP modulation.
Figure 1C:
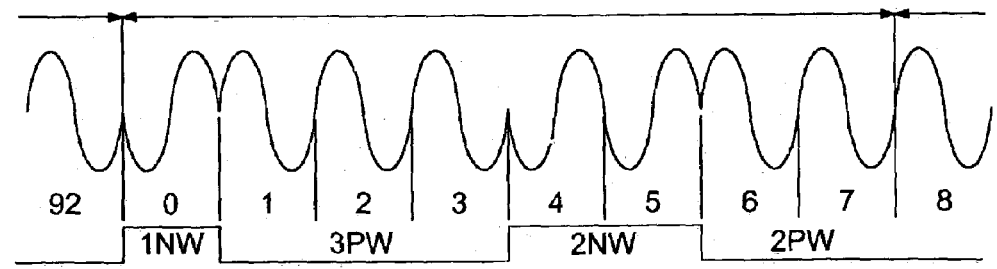
FIG. 1C shows the data 1 of the ADIP modulation.
Figure 2:
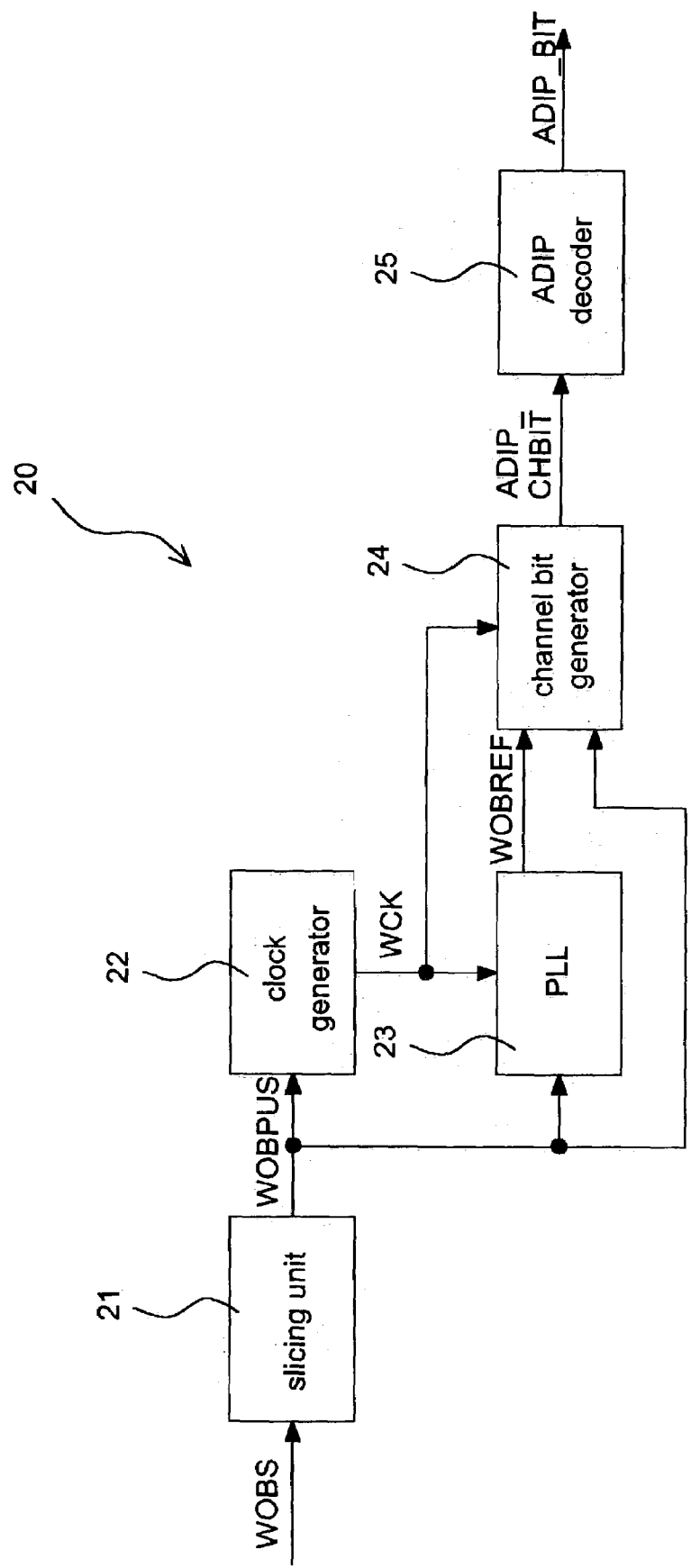
FIG. 2 shows a block diagram of an ADIP demodulation apparatus of the present invention.

FIG. 2 shows a block diagram of an ADIP demodulation apparatus of the present invention. Referring to FIG. 2, the ADIP demodulation apparatus 20 includes a slicing unit 21, a clock generator 22, a phase locked loop (PLL) 23, a channel bit generator 24, and an ADIP decoder 25.

The slicing unit 21 receives a wobble signal WOBS and slices the wobble signal WOBS into a binary signal with levels of 1 and 0 according to a slicing level. The binary signal is defined as a wobble pulse WOBPUS. The cycle length of the wobble pulse WOBPUS is 32T, wherein T is the basic pulse length. The clock generator 22 generates a reference clock WCK according to the wobble pulse WOBPUS. The reference clock WCK is a reference signal with frequency higher than the wobble pulse WOBPUS, and the cycle length thereof is 2T or 1T, for example. The phase locked loop 23 generates a reference wobble signal WOBREF with the same frequency and phase as the wobble pulse WOBPUS according to the reference clock WCK. The cycle length of the reference wobble signal WOBREF is also 32T. The channel bit generator 24 generates the channel bit signal according to the wobble pulse WOBPUS, the reference wobble signal WOBREF, and the reference clock WCK. Finally, the ADIP decoder 25 is employed to decode the channel bit signal into the ADIP bit signal.

Figure 3:
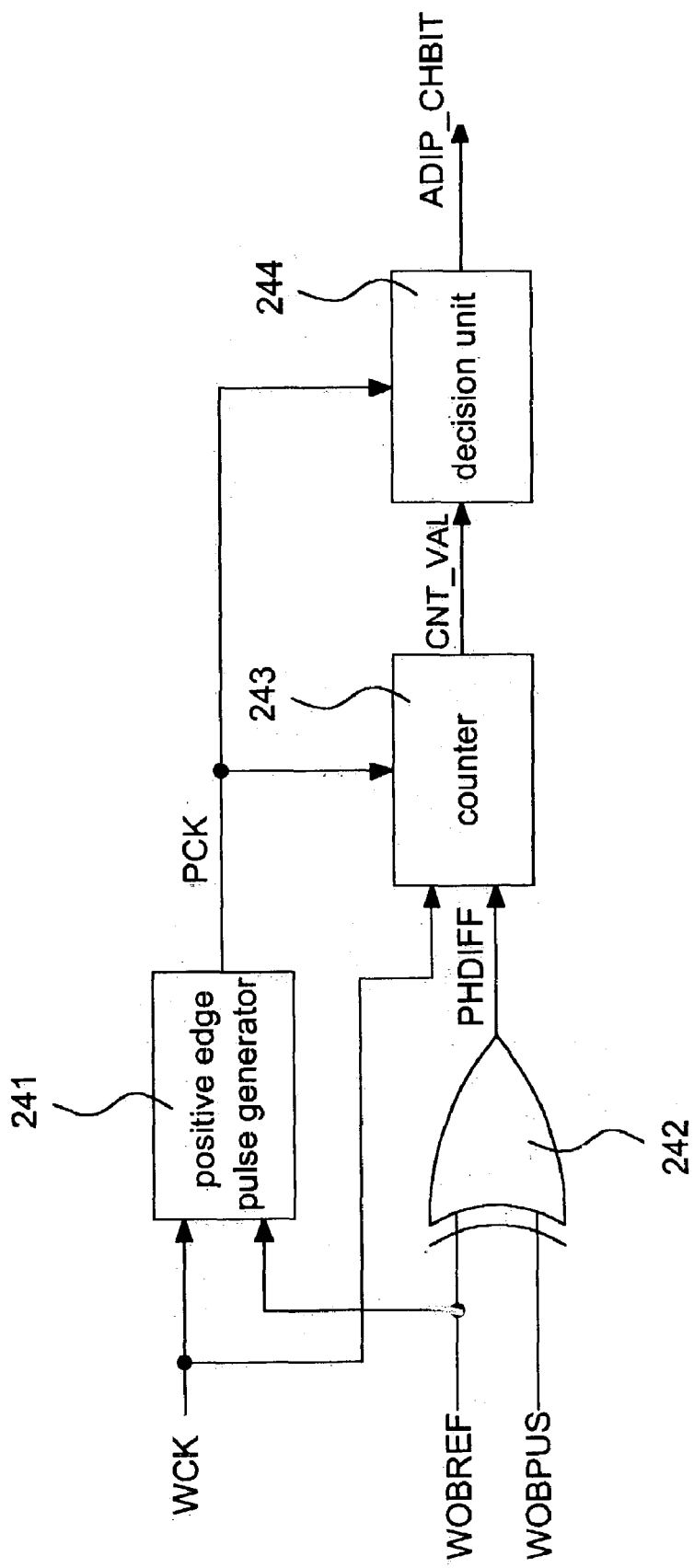
FIG. 3 shows a block diagram of a channel bit generator.

FIG. 3 shows a block diagram of the channel bit generator. Referring to FIG. 3, the channel bit generator 24 includes a positive-edge pulse generator 241, an XOR gate (bit comparator) 242, a counter 243, and a decision unit 244. The XOR gate 242 receives the wobble pulse WOBPUS and the reference wobble signal WOBREF and generates a difference signal PHDIFF between the wobble pulse WOBPUS and the reference wobble signal WOBREF. The positive-edge pulse generator 241 receives the reference wobble signal WOBREF and the reference clock WCK and generates a positive edge pulse PCK at the positive edge of the reference wobble signal WOBREF. The counter 243 counts the pulse number of the reference clock WCK during the high level of the difference signal PHDIFF in each cycle of the reference wobble signal WOBREF (or each cycle of the positive edge pulse PCK) and outputs a count value as a duty cycle. The counter 243 clear the count value at the negative edge of the positive edge pulse PCK. The decision unit 244 receives the count value of the counter 243, compares the count value (duty cycle) with a threshold value at the negative edge of the positive edge pulse PCK, and then outputs the channel bit signal. The decision unit 244 is a comparator for comparing the count value with a threshold value, and then outputting the channel bit signal at the negative edge of each positive edge pulse PCK.

The operation principle of the decision unit 244 will be described in the following. If the cycle length of the reference wobble signal WOBREF is 32T and the cycle length of the reference clock WCK is 2T, then there are 16 pulses of the reference clock WCK in each cycle of the reference wobble signal WOBREF. Therefore, if one phase of the wobble pulse WOBPUS is changed, that is, the phases between the wobble pulse WOBPUS and the reference wobble signal WOBREF are reverse, the difference signal PHDIFF is changed to H and the value of the counter 243 should be 16. However, since the wobble pulse WOBPUS will be influenced by the noise, the value of the counter 243 may be smaller than 16, but the difference is not too great. Consequently, as long as the threshold value of the decision unit 244 is properly set (for example, the threshold value is set to 8 in this embodiment), the channel bit signal is free from being influenced by the noise. Then, the decision unit 244 can correctly generate the channel bit signal. That is, if the duty cycle of the difference signal is greater than a threshold, for example 50%, the channel bit signal is H, otherwise the channel bit signal is L.

FIGS. 4A~4H show the schematic illustration of the waveforms of some signals in the ADIP demodulation apparatus of the invention, wherein FIG. 4A shows the wobble signal, FIG. 4B shows the wobble pulse WOBPUS, FIG. 4C shows the reference wobble signal WOBREF, FIG. 4D shows the difference signal PHDIFF, FIG. 4E shows the reference clock WCK, FIG. 4F shows the positive edge pulse PCK, FIG. 4G shows the count value, and FIG. 4H shows the channel bit signal. As shown in the FIGS. 4A~4H, the slicing unit receives the wobble signal of FIG. 4A and generates the wobble pulse WOBPUS of FIG. 4B. The reference clock generator 22 generates the reference clock WCK of FIG. 4E according to the wobble pulse WOBPUS of FIG. 4A. The phase locked loop 23 generates the reference wobble signal WOBREF of FIG. 4C according to the wobble pulse WOBPUS of FIG. 4B and the reference clock WCK of FIG. 4E. The XOR gate 242 generates the difference signal PHDIFF of FIG. 4D according to the wobble pulse WOBPUS of FIG. 4B and the reference wobble signal WOBREF of FIG. 4C. The positive-edge pulse generator 241 generates the positive edge pulse PCK of FIG. 4F according to the reference clock WCK of FIG. 4E and the reference wobble signal WOBREF of FIG. 4C. The counter 243 outputs the count value CNT_VAL of FIG. 4G. Finally, the decision unit 244 generates the channel bit signal of FIG. 4H according to the count value CNT_VAL of FIG. 4G.

Figure 5:
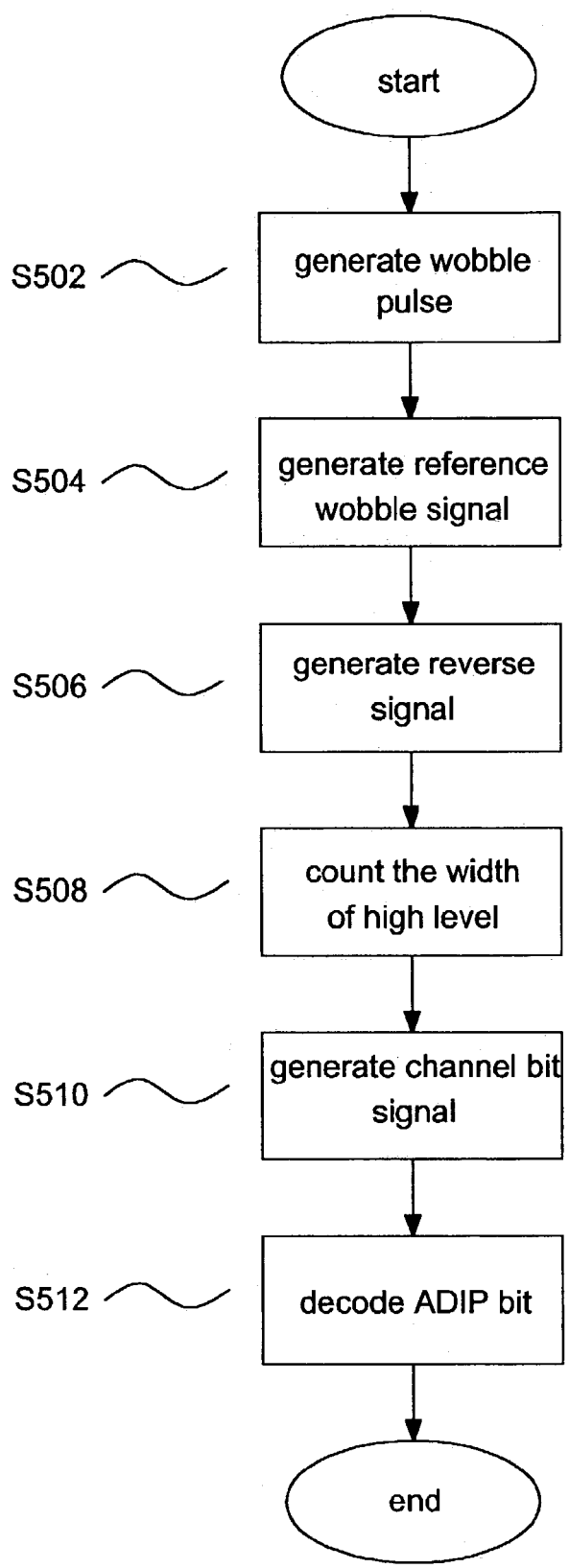
FIG. 5 shows a flow chart of an ADIP demodulation method of the present invention.

FIG. 5 shows a flow chart of an ADIP demodulation method of the present invention. Referring to FIG. 5, the ADIP demodulation method of the invention includes the following steps.

Step S502: generate a wobble pulse WOBPUS. A wobble signal is sliced into a binary signal as the wobble pulse WOBPUS.

Step S504: generate a reference wobble signal WOBREF. A phase locked loop PLL is used to generate the reference wobble signal WOBREF with the same frequency and phase as the wobble pulse WOBPUS.

Step S506: generate a difference signal PHDIFF. The reference wobble signal WOBREF and the wobble pulse WOBPUS are XORed to generate the difference signal PHDIFF.

Step S508: calculate the duty cycle of the difference signal PHDIFF. A counter is used to count the high level width of the difference signal PHDIFF corresponding to each cycle of the wobble pulse WOBPUS using a reference clock with frequency higher than the wobble pulse WOBPUS and to output a count value as the duty cycle.

Step S510: generate a channel bit signal. When the count value (duty cycle) is higher than a threshold value, the channel bit signal is H; otherwise the channel bit signal is L.

Step S512: generate the ADIP information. When the channel bit signal sequence is 1110000 or its similar sequence, the ADIP information is the sync signal. When the channel bit signal sequence is 10000011 or its similar sequence, the ADIP information is 0. When the channel bit signal sequence is 10001100 or its similar sequence, the ADIP information is 1.

Since the invention uses a counter to calculate the duty cycle of the difference signal PHDIFF and output a count value (duty cycle), and then uses a comparator to compare the count value with a threshold value so as to generate a channel bit signal, the ADIP demodulation apparatus of the invention can provide good noise immunity for ADIP signal.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. An ADIP demodulation apparatus, which is applied to an optical disk driver to generate ADIP information according to a wobble signal, the ADIP demodulation apparatus comprising:
  a slicing unit for receiving the wobble signal and generating a wobble pulse by slicing the wobble signal;
  a phase locked loop for generating a reference wobble signal with the same frequency and phase as the wobble pulse according to the wobble pulse;
  a channel bit generator for producing a channel bit signal according to a difference signal generated by comparing the phase of the reference wobble signal with that of the wobble pulse; and
  a decoder for decoding to the ADIP information according to the channel bit signal;
  wherein the channel bit generator comprises:
  a bit comparator for receiving the wobble pulse and the reference wobble signal and generating the difference signal;
  a counter for counting the width of high level of the difference signal corresponding to each wobble pulse using a counting clock and outputting a unit value; and
  a decision unit for comparing the count value with a threshold value and then outputting the channel bit signal.

2. The ADIP demodulation apparatus according to claim 1, further comprising a reference clock generator for generating the counting clock according to the wobble pulse.

3. The ADIP demodulation apparatus according to claim 1, wherein the ADIP information is a sync signal when the channel bit signal sequence is a first sequence.

4. The ADIP demodulation apparatus according to claim 3, wherein the ADIP information is data 0 when the channel bit signal sequence is a second sequence.

5. The ADIP apparatus demodulation according to claim 4, wherein the ADIP information is data 1 when the channel bit signal sequence is a third sequence.

6. The ADIP demodulation apparatus according to claim 1, wherein the difference signal is generated by executing an XOR operation between the reference wobble signal and the wobble pulse.

7. The ADIP demodulation apparatus according to claim 1, wherein the difference signal is generated by executing minus operation between the reference wobble signal and the wobble pulse.

8. The ADIP demodulation apparatus according to claim 3, wherein the first sequence is 11110000.

9. The ADIP demodulation apparatus according to claim 4, wherein the first sequence is 10000011.

10. The ADIP demodulation apparatus according to claim 5, wherein the first sequence is 10001100.

11. An ADIP demodulation method, which is applied to an optical disk driver to generate ADIP information according to a wobble signal, the ADIP demodulation method comprising the steps of:
  receiving the wobble signal;
  generating a wobble pulse by slicing the wobble signal;
  generating a reference wobble signal with the same frequency and phase as the wobble pulse according to the wobble pulse;
  generating a difference signal by comparing the wobble pulse with the reference wobble signal;
  counting the width of high level of the difference signal corresponding to each wobble pulse using a counting clock and outputting a count value;
  comparing the count value with a threshold value and then outputting a channel bit signal; and
  decoding the channel bit signal to generate the ADIP information.

12. The ADIP demodulation method according to claim 11, further comprising the step of generating the counting clock according to the wobble pulse.

13. The ADIP demodulation method according to claim 11, wherein the ADIP information is a sync signal when the channel bit signal sequence is a first sequence.

14. The ADIP demodulation method according to claim 13, wherein the first sequence is 11110000.

15. The ADIP demodulation method according to claim 13, wherein the ADIP information is data 0 when the channel bit signal sequence is a second sequence.

16. The ADIP demodulation method according to claim 15, wherein the second sequence is 10000011.

17. The ADIP demodulation method according to claim 15, wherein the ADIP information is data 1 when the channel bit signal sequence is a third sequence.

18. The ADIP demodulation method according to claim 17, wherein the third sequence is 10001100.

* * * * *